Oct. 19, 1965          M. BOYER          3,212,249
MOWING MACHINE SICKLE GUARD
Filed May 8, 1963
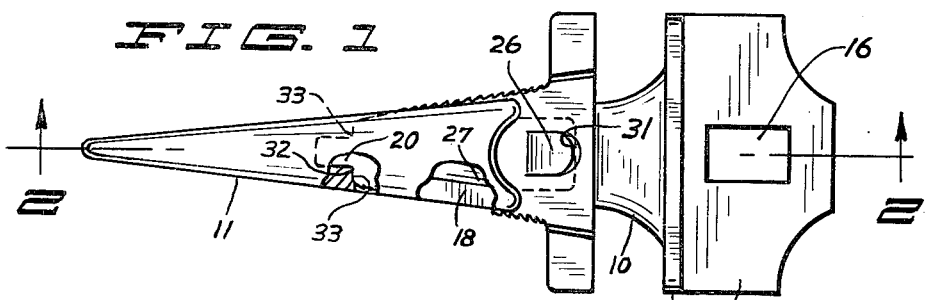
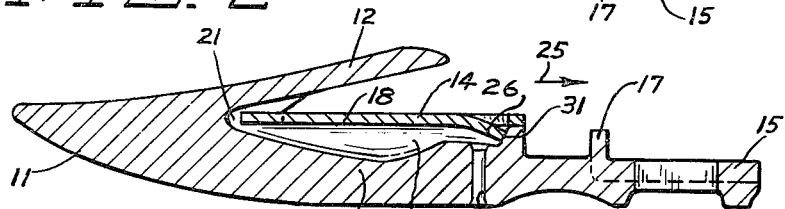
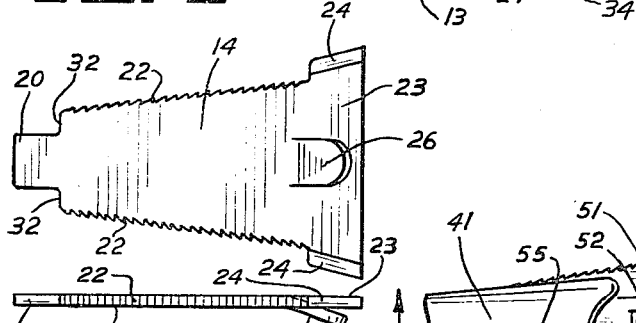
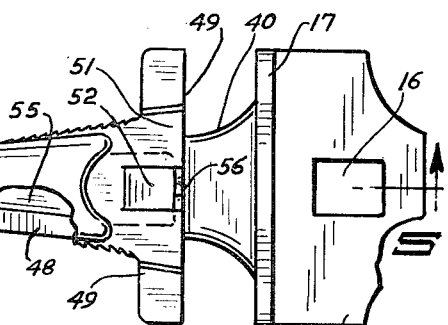
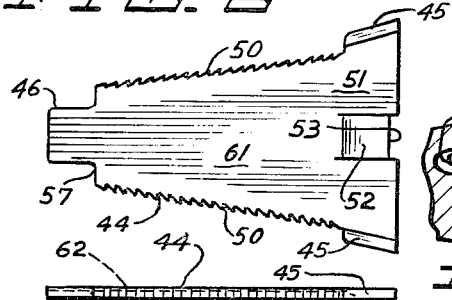
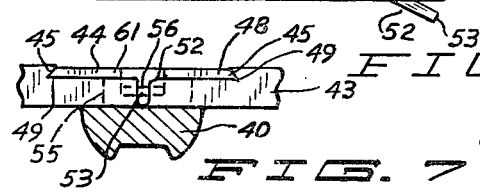
INVENTOR.
MARTIN BOYER
BY
Dugger, Broddock, Johnson & Westman
ATTORNEYS

United States Patent Office 3,212,249
Patented Oct. 19, 1965

3,212,249
MOWING MACHINE SICKLE GUARD
Martin Boyer, Lowry, Minn., assignor of one-half to
Arthur R. Tompte, Sacred Heart, Minn.
Filed May 8, 1963, Ser. No. 278,895
3 Claims. (Cl. 56—311)

The present invention has relation to a mowing machine sickle guard and more particularly to a sickle guard wherein the ledger plate for the sickle is replaceable and easily removed or installed as desired.

Many different types of devices for attaching ledger plates in sickle guards have been advanced. None has proved completely satisfactory, either because of excessive costs or because of wear of the interlocking parts causing misfit. It is important the ledger plates be replaceable so that as they wear the entire guard does not have to be replaced.

The device of the present invention presents a replaceable ledger plate for a sickle guard in two different forms which makes the replacement procedure both positive and yet simple. The ledger plate is very low in cost, easy to manufacture and will not work loose as it is being used.

It is an object of the present invention to present a sickle guard having an improved easily installed replaceable ledger plate.

In the drawings,

FIG. 1 is a top plan view of a sickle guard having a ledger plate made according to a first form of the invention installed thereon;

FIG. 2 is a sectional view taken as on line 2—2 in FIG. 1;

FIG. 3 is a top plan view and FIG. 3A is a side elevational view of a ledger plate used in the device of FIG. 1;

FIG. 4 is a fragmentary top plan view of a sickle guard having a ledger plate made according to a second form of the present invention installed thereon;

FIG. 5 is a sectional view taken as on line 5—5 in FIG. 4;

FIG. 6 is a top plan view and FIG. 6A is a side elevational view of a ledger plate made according to a second form of the present invention; and FIG. 7 is a fragmentary rear end view of the device of FIG. 4 taken as on line 7—7 in FIG. 5.

Referring specifically to FIGS. 1 through 3 and a first form of the invention, it can be seen that a mower guard 10 of substantially conventional design includes a main body 11 which is pointed and has a tongue 12 extending up over a base portion 13 on which a ledger plate 14 is mounted. The guard has an ear 15 provided with an elongated slot 16 therein. The slot 16 permits the guard to be adjusted so that a locating rib 17 is properly positioned against the cutter bar of a mowing machine or combine regardless of the type of the machine. The elongated slot 16 makes the guard universal.

The ledger plate 14 is mounted on the base 13 on a provided seat 18. The seat is a flat surface. The ledger plate has a forward tongue portion 20 which fits within a provided receptacle 21 within the guard. The ledger plate has a pair of serrated side edge surfaces 22 which diverge rearwardly toward a rear portion 23. The side edges of the rear portion 23 are dove-tailed as at 24 to fit within provided dove-tailed slots in the base 13 of the guard. The dove-tailed slots have been used on ledger plates previously to keep the ledger plates down firmly against the guard seat 18.

In order to prevent the ledger plate from moving rearwardly in direction as indicated by arrow 25 and thus becoming loosened from the guard, a unique structure is provided. A tab 26 is partially punched through the ledger plate 14 and extends downwardly below the bottom surface thereof. When the ledger plate is installed the tab is positioned within an interior recess 27 provided in the guard body. The end surface 28 of the tab is positioned to abut against an inclined surface 31 forming a rear wall of the recess 27. By forcing the tab downwardly as shown in FIG. 2 against surface 31, the ledger plate is securely held so that shoulders 32 of the ledger plate are abutting against ledges or stop surfaces 33 provided in the sickle guard adjacent receptacle 21.

Thus the ledger plate is held from moving in direction as indicated by arrow 25 and will not come loose during use.

When the ledger plate is to be changed, a small punch can be driven through a hole 34 provided in the guard body and aligned with the tab 26. The tab 26 can be pounded to a position clearing the surface 31 and the ledger plate can thus be slid rearwardly in direction as indicated by arrow 25 out of the dove-tailed slots and removed from the guard. A new ledger plate can then be installed and the tab 26 of the new ledger plate pounded into position as shown.

The ledger plates can be changed in the field without any special tools and without removing the guards from the machine, if desired.

The ledger plates are easy to manufacture, extremely low in cost and fool proof in operation. The ledger plates can be used on combines, mowing machines or other units utilizing sickles for cutting material. There are no holes to drill or punch out and it makes a universal unit for all of the various cutter bars.

*Second form of invention*

Referring to FIGS. 4 through 7, a second form of the present invention is shown. The forward portions of the sickle guard in this form of the invention are the same and the ledger plate is held in a similar manner. However, some changes in construction are made.

In this form of the invention a sickle guard 40 is made to be mounted onto a cutter bar as previously described. An ear 15 that has a hole 16 is provided. The sickle guard 40 has a tongue 41, a main body 42 and a rear portion 43 used for mounting a ledger plate 44. The ledger plate is supported by a provided seat 48. The ledger plate 44 has beveled edges 45 which fit within dove-tailed grooves 49 provided in the rear portion of the sickle guard, as in the first form of the invention and as seen in FIG. 7. The dove-tail grooves hold the ledger plate against seat 48. The ledger plates 44 also has a forward tongue 46 which fits within the receptacle 47 provided toward the forward end of the sickle guard 40. The ledger plate also has a pair of serrated edges 50 diverging rearwardly to a rear portion 51.

The rear portion 51 has a tab 52 partially punched out therefrom and depending downwardly as shown in FIG. 6. The tab 52 has a straight end surface 53 which abuts against an inclined surface 54 which forms a rear wall of an interior recess 55 in the guard. As seen in FIGS. 4 and 7, the rear wall 54 has a small notch 56 defined therethrough. The notch 56 extends down to the bottom of the recess 55.

The ledger plate is slid forwardly to position wherein a pair of shoulders 57 abut against stop surfaces in the guard as in the first form of the invention. The tab 52 is then driven downwardly against the tapered rear wall 54 and this in turn forces the ledger plate 44 to position so that shoulders 57 of the ledger plate are tightly forced against the stop surfaces in the guard and the ledger plate is held firmly. By adjusting the amount that the tab 52 is depressed, the force with which the ledger plate is held can be controlled.

When the ledger plate is to be removed a small punch can be inserted through the slot 56 underneath the bottom edge of tab 52 and the tab pried upwardly. When the tab clears the wall surface 54 the entire ledger plate can be slid rearwardly in direction as indicated by arrow 60. Thus the ledger plate can be removed as the first form of the invention.

This ledger plate, as shown in FIGS. 4 through 7, also is easy to manufacture. The tab 52 in this ledger plate extends to the rear edge of the ledger plate. The tab can be trimmed slightly to insure a proper fit against surface 54.

As shown in FIG. 6 the ledger plate can have a hollow ground top surface 61 in order to improve its function. The hollow ground surface tapers gradually inwardly from the side edge surfaces 50 toward the center thereof, which is depressed from a plane joining the tops of the side edge surfaces 50. The depression is illustrated in dotted lines at 62 in FIG. 6 and is seen in FIG. 7.

By utilizing a tab in ledger plate which can be wedged against a surface provided on the sickle guard a quickly removable and easily installed ledger plate can be made. The ledger plate will not come loose during operation.

What is claimed is:

1. The combination with a sickle guard comprising a main body portion having a seat thereon, stop means at the forward portion of said seat, and a dove-tail groove at the rear of said seat, of: a recess provided in said sickle guard and opening to said seat and forming a peripheral seat surface, said recess being partially defined by a forwardly and downwardly sloping rear end wall, a ledger plate mounted on said seat, said ledger plate having beveled edge surfaces adapted to fit within said dove-tail groove to hold said ledger plate tightly down onto said peripheral seat, a shoulder on said ledger plate adapted to engage said stop surface of said guard, a deformable tab integral with said ledger plate and depending downwardly and rearwardly therefrom, said tab being deformable out of the plane of said ledger plate to engage said sloping rear surface of said recess and force said ledger plate forwardly against said stop surface as said tab is deformed downwardly, and a slot of less width than the sloping surface provided through the rear wall forming part of said recess, said slot being of size to permit a tool to be inserted to bend said tab back into the plane of said ledger plate.

2. The combination as specified in claim 1 wherein said guard has an attachment ear integral with the rear portions thereof, said attachment ear provided with an elongated slot therethrough.

3. The combination as specified in claim 1 wherein the tab has an end surface substantially parallel to the sloping surface.

References Cited by the Examiner
UNITED STATES PATENTS

| | | | |
|---|---|---|---|
| 268,459 | 12/82 | Burnap | 56—307 |
| 1,540,157 | 6/25 | Bagan | 56—311 |
| 1,839,520 | 1/32 | Aamodt | 56—311 |
| 1,940,908 | 12/33 | Farris | 56—311 |
| 2,669,831 | 2/54 | Vik | 56—311 |

ANTONIO F. GUIDA, *Primary Examiner.*

RUSSELL R. KINSEY, T. GRAHAM CRAVER,
*Examiners.*